United States Patent
Zeffer (10) Patent No.: US 9,606,924 B2
(45) Date of Patent: Mar. 28, 2017

(54) SYSTEM AND METHOD FOR SUPPORTING FAST AND DETERMINISTIC EXECUTION AND SIMULATION IN MULTI-CORE ENVIRONMENTS

(75) Inventor: Hakan Zeffer, Enskede (SE)

(73) Assignee: Wind River Systems, Inc., Alameda, CA (US)

(*) Notice: Subject to any disclaimer, the term of this patent is extended or adjusted under 35 U.S.C. 154(b) by 1097 days.

(21) Appl. No.: 13/530,802

(22) Filed: Jun. 22, 2012

(65) Prior Publication Data
US 2013/0346682 A1 Dec. 26, 2013

(51) Int. Cl.
*G06F 9/30* (2006.01)
*G06F 12/08* (2016.01)
*G06F 11/36* (2006.01)

(52) U.S. Cl.
CPC ...... *G06F 12/0842* (2013.01); *G06F 11/3612* (2013.01)

(58) Field of Classification Search
None
See application file for complete search history.

(56) References Cited

U.S. PATENT DOCUMENTS

2009/0165006 A1* 6/2009 Ceze et al. ............ 718/102

* cited by examiner

*Primary Examiner* — Corey S Faherty
(74) *Attorney, Agent, or Firm* — Fay Kaplun & Marcin, LLP

(57) ABSTRACT

The exemplary embodiments described herein relate to supporting fast and deterministic execution and simulation in multi-core environments. Specifically, the exemplary embodiments relate to systems and methods for implementing determinism in a memory system of a multithreaded computer. A exemplary system comprises a plurality of processors within a multi-processor environment, a cache memory within the processor and including metadata, and a hardware check unit performing one of a load check and a store check on the metadata to detect a respective one of a load metadata mismatch and a store metadata mismatch, and invoking a runtime software routine to order memory references upon a detection of one of the load metadata mismatch and the store metadata mismatch.

20 Claims, 6 Drawing Sheets

SYSTEM AND METHOD FOR SUPPORTING FAST AND DETERMINISTIC EXECUTION AND SIMULATION IN MULTI-CORE ENVIRONMENTS

BACKGROUND

Within the computer industry, parallel processing refers to the simultaneous use of more than one processor core, or central processing unit ("CPU"), to execute a program or multiple computational threads. Typically, parallel processing of an application allows for a program to run faster since there are more engines in operation. In practice, parallel processing operates on the principle that large problems can be divided into smaller ones, which are then solved concurrently (i.e., "in parallel") across the multiple processors. Parallel computer programs are more difficult to write than sequential ones due to the fact that concurrency introduces several new classes of potential software bugs. In addition, communication and synchronization between the different subtasks may present further obstacles to optimize parallel program performance.

Debugging parallel applications is very challenging since there is no determinism or guarantees between different runs in terms of memory system interleaving. Determinism may be defined as a predictability for a first computer state to determine its next state, which then determines its following state, etc. For instance, if an application is run once and that run exposes a potential bug, it is extremely difficult to trigger this potential bug again (e.g., repeatability). Another further area in which determinism and performance is extremely important is within high-performance simulation and emulation. For instance, it is very challenging to allow the simulated target machine to get speedup from multiple host machine cores or processors while maintaining key properties such as determinism. This is especially true when the host machine is not deterministic. In parallel computing, speedup refers to how much a parallel algorithm is faster than a corresponding sequential algorithm.

SUMMARY OF THE INVENTION

The exemplary embodiments described herein relate to supporting fast and deterministic execution and simulation in multi-core environments. Specifically, the exemplary embodiments relate to systems and methods for implementing determinism in a memory system of a multithreaded computer. One exemplary embodiment is a system comprising a plurality of processors within a multi-processor environment, a cache memory within the processor and including metadata, and a hardware check unit performing one of a load check and a store check on the metadata to detect a respective one of a load metadata mismatch and a store metadata mismatch, and invoking a runtime software routine to order memory references upon a detection of one of the load metadata mismatch and the store metadata mismatch.

Another exemplary embodiment is a method of updating an address table comprising inserting metadata into a cache memory of a processor in a system including a plurality of processors, performing one of a load check on the metadata to detect a respective one of a load metadata mismatch and a store metadata mismatch, and invoking a runtime software routine to order at least one memory reference upon a detection of one of the load metadata mismatch and the store metadata mismatch.

A further exemplary embodiment is a non-transitory computer readable storage medium including a set of instructions executable by a processor, wherein the set of instructions, when executed, resulting in a performance of the following inserting metadata into a cache memory of a processor in a system including a plurality of processors, performing one of a load check and a store check on the metadata to detect a respective one of a load metadata mismatch and a store metadata mismatch, and invoking a runtime software routine to order memory references upon a detection of one of the load metadata mismatch and the store metadata mismatch.

DETAILED DESCRIPTION

The exemplary embodiments may be further understood with reference to the following description and the appended drawings, wherein like elements are referred to with the same reference numerals. The exemplary embodiments described herein relate to supporting fast and deterministic execution and simulation in multi-core environments.

Specifically, the exemplary embodiments relate to systems and methods for implementing determinism in a memory system of a multithreaded computer. Accordingly, the exemplary embodiments enable deterministic execution of parallel benchmarks with very low overhead.

In addition, exemplary embodiments enable parallel simulation on multiprocessor and multi-core hosts without any software instrumentation or checks. Furthermore, the exemplary embodiments allow for an unlimited number of fine-grained physical address checkpoints enabling fast debugging. The specific number of checkpoints may only be limited by the amount of physical memory within the system.

The conventional process of debugging parallel applications is very difficult and poses several disadvantages. In particular, one reason conventional debugging is so difficult is that there is neither determinism nor any guarantees between different runs in terms of memory system interleaving. For instance, if an application is run once and that run exposes a potential bug, it is extremely difficult to trigger this potential bug once again. The reason is that the underlying hardware fails to make guarantees on determinism or repeatability in regard to the manner in which memory system references are interleaved and ordered.

While it may be possible to get determinism by instrumenting the binary files with load and store checking code, this process drastically reduces the overall performance of the application. Moreover, the instrumentation tools and source code would need to be available to the user (e.g., developers), and this is not always the case (e.g., for libraries, commercial applications, operating systems, etc.).

A load typically loads a value from memory (e.g., represented by the L1D cache) and places it in a register in the core. The address is typically taken from core registers, or may be computed from core register values and constants. A store typically stores a value from a core register and places it in memory (e.g., represented by the L1D or L2 cache). The address is typically taken from core registers, or may be computed from core register values and constants.

In addition to debugging applications, another area in which determinism and performance would be advantageous is high-performance simulation and emulation. In a simulator, it is important to have very low overhead in order to enable runs with large and complex software. However, the operation and functions of the simulator is also of importance. For instance, the simulator should be capable of being stopped at any time; the simulation should be capable of being stopped due to fine-grained watch points; the simulated state should be capable of being inspected at all times; and two consecutive runs should be capable of yielding the same result, thereby providing repeatability and determinism.

Using conventional methods, it is very difficult for simulator developers to let the simulated target machine get speedup from multiple host machine cores or processors while implementing the features described above. As noted above, speedup refers to how much a parallel algorithm is faster than a corresponding sequential algorithm. A further drawback comes from the fact that the underlying hardware is not deterministic. In order for these conventional methods to achieve determinism, expensive checks have to be inserted in the simulator fast-path to support determinism.

While conventional processors have incorporated metadata in dynamic random-access memory ("DRAM"), these processors do not use such metadata for enabling deterministic execution and memory interleaving within either multi-core or multiprocessor systems. The capability to simply store per cache-line metadata in DRAM using these conventional processors lacks the determinism and low overhead execution of the exemplary embodiments described herein. Furthermore, conventional processors do not allow for implementation of low-overhead deterministic execution of parallel workloads, nor enable deterministic simulation of multithreaded targets on multithreaded hosts.

As will be described in greater detail below, the exemplary systems and methods described herein enable deterministic execution of parallel benchmarks with very low overhead. According to an exemplary embodiment, a few bits of metadata (e.g., on the order of 8 bits) may be added per cache line in the system. This metadata may follow the cache line through caches and into memory, such as an exemplary DRAM. For instance, if a load that is to be executed is associated with a metadata value that corresponds neither to the ID of the core nor to the maximum metadata value (e.g., 255 for metadata of 8 bits), then that core will be trapped. That is, a low-level software routine will stall the core in question due to the metadata mismatch. By trapping cores that have no current permission, a system may coordinate the parallel operation of these cores in a deterministic manner by handing out permission deterministically. The manner in which permission is defined and handed out may be determined by a low-level software routine. For instance, a round-robin manner may be used when permission is handed out in a deterministic scheme. Similarly, if a store is to be executed by a core, the cache controller associated with the core in question will determine whether the metadata associated with the store matches the ID of this core. If no match occurs, then the core is trapped.

According to the exemplary embodiments described herein, minimalistic and unobtrusive hardware may check this metadata for loads and stores. Upon encountering and signaling a metadata mismatch, the hardware checks may transfer control to a minimalistic runtime library. It should be noted that the exemplary embodiments will be described using 8 bits of metadata, thereby enabling up to 255 cores to execute in a deterministic manner. However, it should be understood that these numbers are merely exemplary, and any number of bits may be possible.

It should be noted that while the exemplary embodiments may be implemented within any type of system that supports a multi-processor architecture or multi-instancing of a single processor, such as asymmetric multiprocessing ("AMP"), symmetric multiprocessing ("SMP"), etc. It should also be noted that the terms "processor" and "CPU" are used interchangeably throughout this description and should be understood to mean any type of computing device that is capable of executing instructions, for example, general purpose processors, embedded processors, digital signal processors ("DSPs"), application specific integrated circuits ("ASICs"), etc.

Throughout this description, hardware operating environments may be described as having multiple CPUs, wherein any given task may have an affinity to one of the CPUs. However, there may be a variety of hardware platforms on which the present invention may be implemented. Specifically, the technique according to the exemplary embodiments may be applied equally to debugging and simulation for any variable of multi-core environments, such as for a multi-CPU target hardware platform, wherein the hardware contains multiple identical CPU processing chips; a multi-core CPU target hardware platform, wherein a single CPU processing chip contains multiple identical processor cores; a multi-threaded CPU target hardware platform, wherein a single CPU processing chip provides multiple virtual processing elements, etc.

Figure 1:
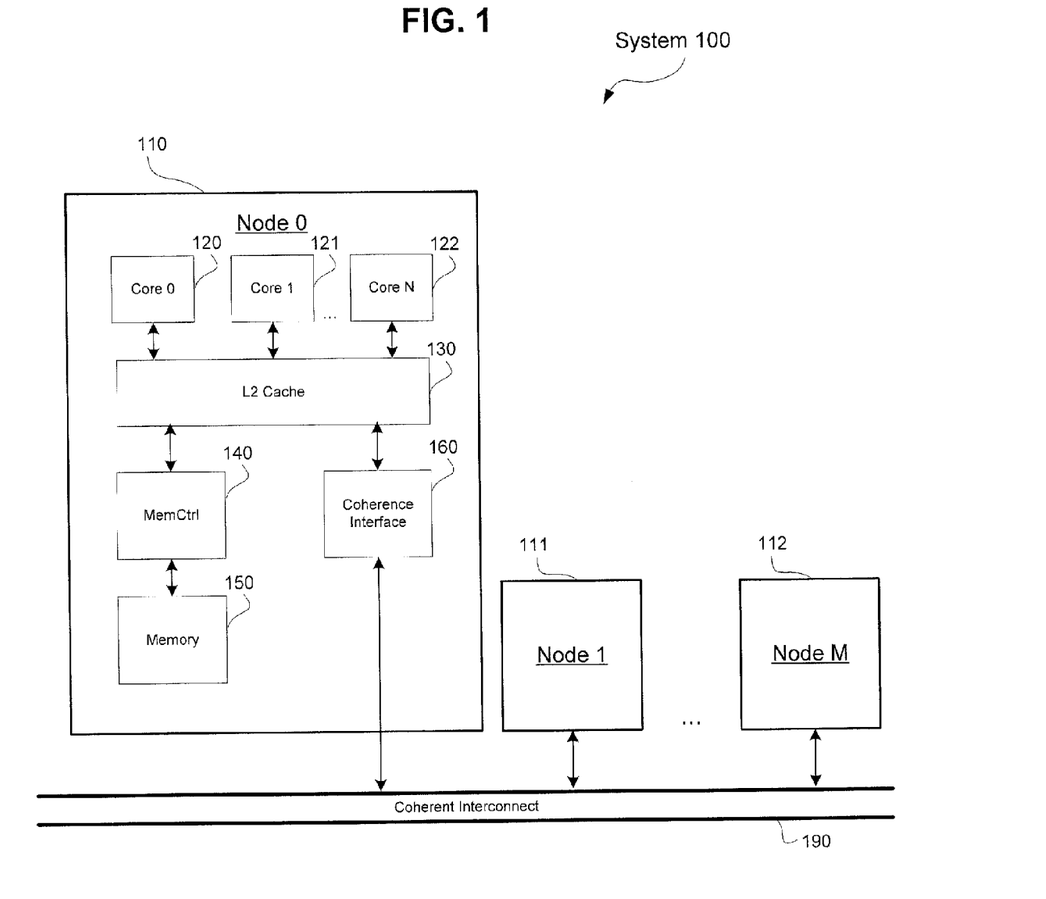
FIG. 1 shows an exemplary embodiment of a system for supporting fast and deterministic execution and simulation in multi-core environments according to the exemplary embodiments described herein.

FIG. 1 shows an exemplary embodiment of a parallel system 100 for supporting fast and deterministic execution and simulation in multi-core environments according to the exemplary embodiments described herein. It should be noted that the system 100 is an overview of one possible implementation of the embodiments described herein. Alternative embodiments are not limited to the example illustrated in FIG. 1 and may allow for variations to the system 100.

According to an exemplary embodiment of the system 100, the system 100 may include a plurality of nodes (e.g., Node-0 110, Node-1 111, Node-M 112, etc.) in communication with a coherent interconnection 190 (e.g., a bus). One exemplary node, such as Node-0 110, may include a plurality of cores (e.g., Core-0 120, Core-1 121, Core-N 122, etc.). Each of the Cores 0-N 120-122 may be in communication with a cache (e.g., level 2 or "L2" Cache 130). The L2 Cache 130 may interface with a memory controller 140 for a memory 150 (e.g., DRAM). The L2 Cache 130 may also interface with a coherence interface 160 with the coherent interconnection 190.

According to the exemplary embodiments described herein, the system 100 may add a few bits of metadata to each cache line of the system 100. If there are 255 cores, then 8 bits of metadata are called for. This metadata may then follow the cache line through the cache (e.g., L2 Cache 130) and into the memory (e.g., DRAM 150). As will be described in greater detail below, hardware checks may be performed on this metadata for loads and stores. When the hardware checks signal a metadata mismatch, control may be transferred to a runtime library.

Thus, as noted above, the exemplary system 100 provides an improved and more efficient manner for deterministic execution of parallel benchmarks with very low overhead, while eliminating any need to recompile the application that would otherwise execute in a deterministic manner. That is, by performing load and store handling based on this metadata arrangement, the system may "trap" loads and stores of different hardware threads and prevent cores from behaving in a non-deterministic manner. Specifically, a low-level software routine may stall the cores lacking permission, and the system may then hand out permission to cores that need them in a deterministic manner.

In other words, a core that does not have permission for a certain load/store will be trapped into the low-level software. This low-level software may synchronize with the other cores and hand out read/write permission in a deterministic manner. For example, a first core may synchronize with the other cores after a certain number of executed instructions or this core may be trapped on a load/store check. Once all of the cores have reached the synchronization point, the low-level software may then hand out read/write permission (e.g., in a round-robin fashion).

In addition, exemplary system 100 enables parallel simulation software across the Nodes 0-M 110-112 without any software instrumentation or software checks. Furthermore, the system 100 allows for a plurality of fine-grained physical address checkpoints for fast debugging, wherein the specific number of checkpoints is to be limited by the amount of physical memory within the system. Fine-grained physical address checkpoints may be defined as watch points implemented on a cache line granularity (e.g., 32, 64 or 128 bytes). Hardware may have a few registers for solving this. Once a debugger runs out of these registers, the debugger typically uses the virtual memory system that uses a page size of 4 k, 8 k or similar. Therefore, with the unlimited number of "fine-grained" watch points, components such as debuggers will run faster. Furthermore, this addition of a few bits of metadata, such as 8-bits of data, to all cache levels, as well as DRAM, allows this system 100 to run in a deterministic fashion with up to 255 cores. Those skilled in the art would understand that embodiments with more or less metadata bits are possible.

Figure 2:
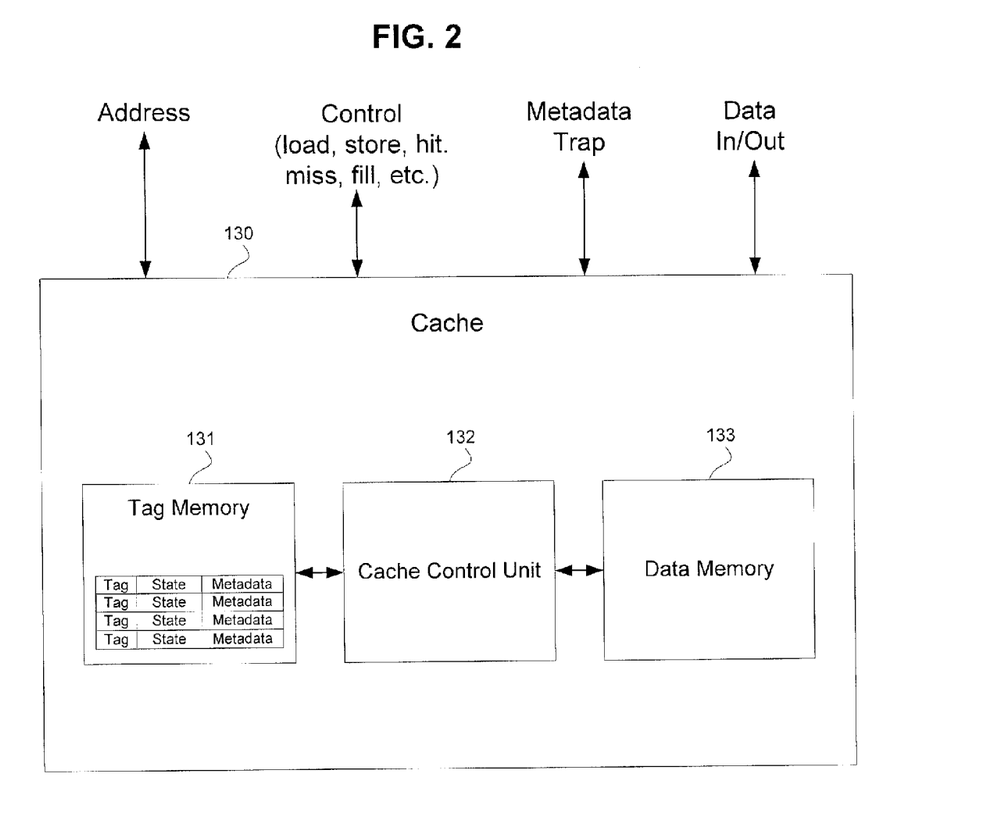
FIG. 2 shows an exemplary embodiment of incorporating metadata into a memory cache according to the exemplary embodiments described herein.

FIG. 2 shows an exemplary embodiment of incorporating metadata into the memory cache and the cache subsystems according to the exemplary embodiments described herein. According to the exemplary embodiments, the cache illustrated in FIG. 2 may be located at a level of cache hierarchy that is closest to the core (e.g., L1D). The exemplary cache 130 may includes a tag memory 131, a cache control unit 132, and a data memory 133. The cache control unit 132 may be coupled to the tag memory 131 and the data memory 133.

The cache 130 may also feature an interface, including one or more ports. Each port includes an address input, control interface, a trap output and a data interface. The control interface may include various signals (e.g. inputs indicating load, store, or fill (L/S/Fill), a hit/miss output, etc.). The trap output may signal a trap to the processor, wherein a "trap" may refer to an exception or a transfer in control flow from an instruction sequence being executed to a designated instruction sequence that is designed to handle a condition detected by one of the Nodes 0-M 110-112. The data interface may include data-in lines (e.g., for a read port or read/write port) and data-out lines (e.g., for a write port or read/write port). In addition, any number of ports may be supported in various embodiments.

The tag memory 131 may comprise a plurality of entries, wherein each entry stores a cache tag for a corresponding cache line in the data memory 133. Accordingly, there may be a one-to-one correspondence between cache tag entries and cache data entries in the data memory 133, wherein each data entry stores a cache line of data. The tag memory 131 and data memory 133 may include any structure and/or configuration, and may implement any cache configuration for the cache 130 (e.g., set associative, direct mapped, fully associative, etc.).

The exemplary cache tags for the tag entries in the tag memory 131 may include an address tag field ("Tag"), a state field ("State") and a set of metadata bits ("Metadata"). The state field may store various other states (e.g., whether or not the cache line is valid and/or modified, replacement data state for evicting a cache line in the event of a cache miss, intra-node coherence state as established by the intra-node coherence scheme implemented on the coherent interconnect 190 of FIG. 1, etc.). The address tag field may store the tag portion of the address of the cache line (e.g., the address tag field may exclude cache line offset bits and bits used to index the cache to select the cache tag). Accordingly, the address tag field may store the address bits that are to be compared to the corresponding bits of the address input to detect hit/miss in the cache 130.

Figure 3:
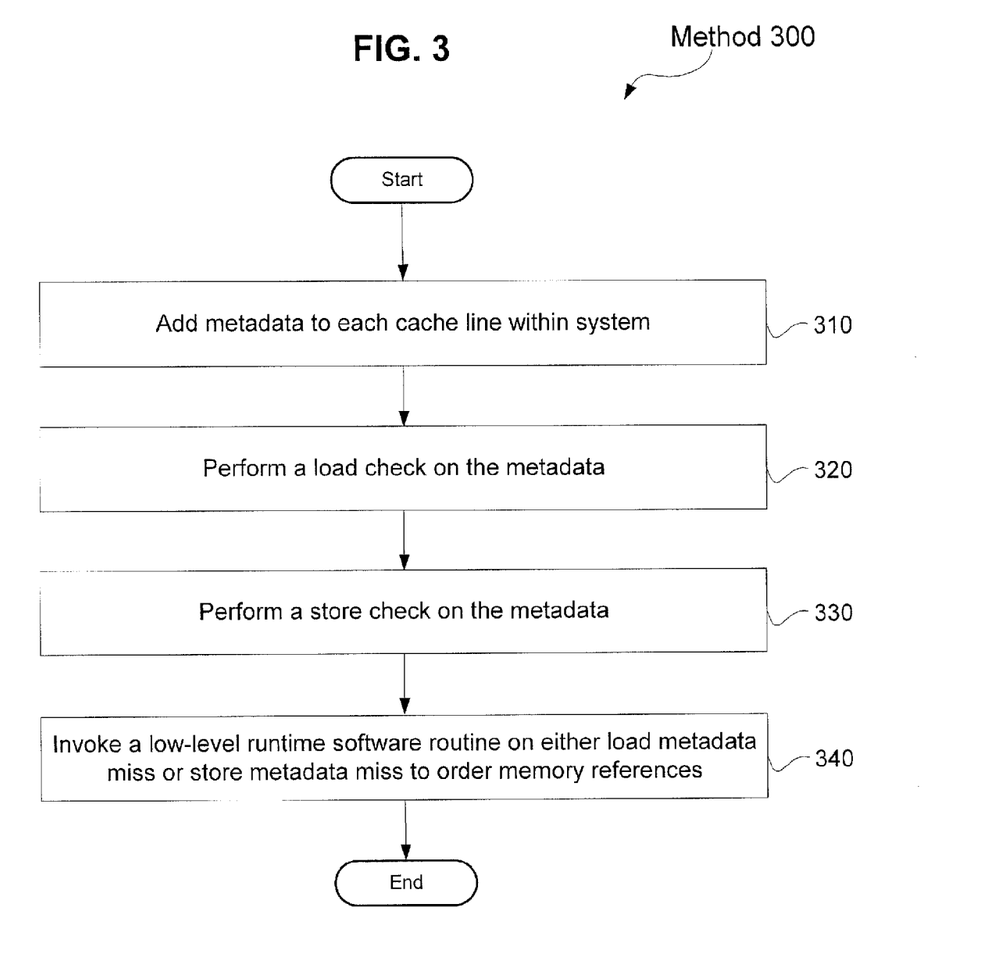
FIG. 3 shows an exemplary embodiment of a method for supporting fast and deterministic execution and simulation in multi-core environments according to the exemplary embodiments described herein.

FIG. 3 shows an exemplary embodiment of a method 300 for supporting fast and deterministic execution and simulation in multi-core environments according to the exemplary embodiments described herein. It should be noted that the exemplary method 300 will be discussed with reference to the system 100 of FIG. 1. The exemplary method 300 may allow for a system having a plurality of parallel processors (e.g., Nodes 0-M) to support fast and deterministic execution and simulation. Therefore, using the exemplary system 100 described above, the method 300 may use metadata to order memory system references in a deterministic manner to allow for repeatability among multiple application runs, ensuring that each run yields the same results.

In step 310, the method 300 may add a few bits of metadata to each cache line in the system 100. As noted above, this metadata follows the cache line into memory 150 and through the cache subsystem.

In steps 320 and 330, the method 300 may add simple hardware checks for checking the metadata for loads and stores to the cache controller 132 of the cache 130. Based on the hardware checks, trap information or mismatch information is routed to the local processor core (e.g., Core-0 120).

Specifically, in step 320, a load check compares the metadata for the "by the load" addressed cache line with two values stored in per hardware thread registers. Step 320 will be described in greater detail below, with reference to FIG. 4. If the metadata matches either of these two stored values, the load check succeeds. If there is a mismatch in the data, the load is signaled an exception/trap. The exception/trap allows for a low-level runtime software routine to run. It should be noted that there are many possible implementations, each dependent on the corresponding architecture of the core implementing this exemplary method 300.

In step 330, a store check compares the metadata for the "by the store" addressed cache line with one value stored in a per-hardware thread register. Step 330 will be described in greater detail below, with reference to FIG. 5. If the metadata matches this value the store check succeeds. If there is a mismatch in the data, the store is signaled an exception/trap so that the low-level runtime software routine may be run in step 340. As noted above, there are several possible implementations for the store check, depending on the corresponding architecture of the core implementing this method 300.

In step 340, the method 300 orders the memory system references accordingly. Specifically, the low-level runtime software library makes it possible to use the current invention for deterministic ordering of memory references and for an unlimited number of fine-grained break/watch points. The low-level software routine is invoked on either a load metadata miss or on a store metadata miss.

According to one exemplary implementation, all memory references may be formed into a global order that is repeatable and deterministic. In this embodiment, the metadata facilitates the ordering of the memory references by preventing cores from executing loads or stores in a non-deterministic fashion. In the case of metadata of 8 bits, the value 255 corresponds to all cores having read permission and a value of x (wherein x is not 255) indicates that core x has both read and write permission but that no other core has read or write permission. The read permission may indicate whether or not read access to the cache line is permitted for memory operations performed by the core coupled to that cache for access. The write permission may similarly indicate whether or not write access to the cache line is permitted for memory operations performed by the core. In other words, read permissions may correspond to a load and write permissions may correspond to a store.

Figure 4:
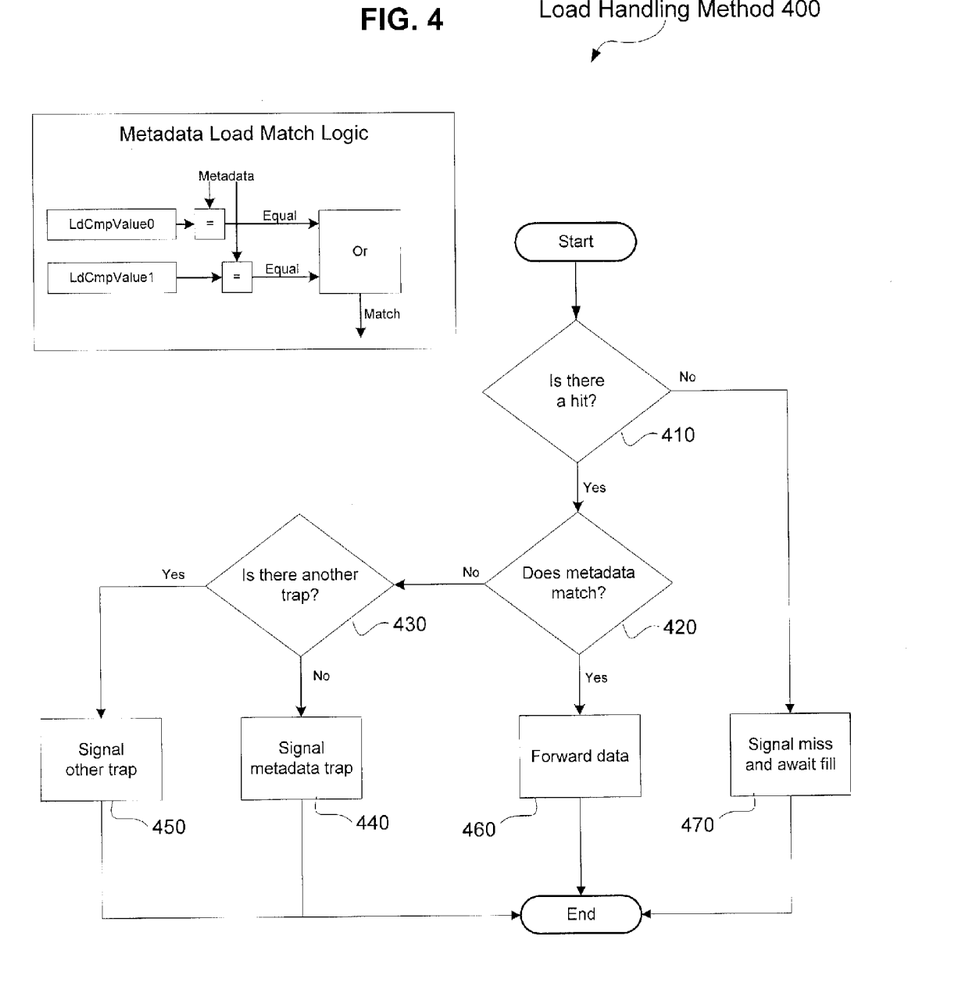
FIG. 4 shows an exemplary embodiment of a load handling method for cache controller load handling for the cache level being closest to the processing core according to the exemplary embodiments described herein.

Accordingly, each core i stores the value i in LdCmpValue0 and the value 255 in LdCmpValue1 (see FIG. 4). Furthermore, each core i stores the value i in StCmpValue0 (see FIG. 5). The hardware may trap a core if 1) a load to a cache line is associated with metadata that is not 255 and 2) the metadata does not have a value matching the core's ID. In a similar manner, the hardware may trap a core if a store to a cache line associated with metadata that is not the core's ID. Therefore, it is possible to stop loads and stores by the different hardware threads when they do not have "permission," as determined by the metadata mismatch described above.

One possible implementation of these software routines may, for instance, stall a core that does not have the current permission. The core may then synchronize with the other cores and permission may be handed out in a deterministic manner to all the cores that require new permission. Specifically, a low-level software routine may perform the synchronization and hand out the permission. Thus, deterministic ordering between all the different cores may be implemented.

According to a further embodiment, the method 300 may implement an unlimited number of break/watch points. For instance, the inserted metadata may represent: 0=no break/watch point, and 1=break/watch point. The load registers may be programmed with a 0 value and the store register may be programmed with a 0 value. Accordingly, the hardware will now perform a trap if the metadata is set to 1. Thus, a debugger may set the metadata for a cache line with a break/watch point to 1.

FIG. 4 shows an exemplary embodiment of a load handling method 400 for cache controller load handling for the cache level closest to the processing core according to the exemplary embodiments described herein. Specifically, a load check compares the metadata (e.g., for the, by the load, addressed cache line) with two values stored in per hardware thread registers. If metadata matches either of these two stored values, the load check succeeds. If not, the load is signaled as an exception/trap so that the low-level runtime software routine can be run.

Accordingly, FIG. 4 illustrates the operation of one embodiment of the cache control unit 132 for a load memory operation accessing the cache 130. It should be noted that method 400 is not limited to the step or order depicted in FIG. 4, as other orders may be used. In addition, each of the steps in the exemplary method 400 may be performed in parallel in combinatorial logic in the cache control unit 123.

In step 410, the method 400 determines whether or not the load memory operation is a hit. If the load memory operation is a miss in the cache 130 in step 410, the method may advance to step 470. In step 470, the cache control unit 132 may signal a miss to the processor and may await the cache fill supplying the cache line for storage, as described in FIG. 6. According to one alternative embodiment, the cache control unit 132 may itself initiate the cache fill. In this example, the cache control unit 132 may signal miss by de-asserting the hit signal on the control interface.

If it is determined that there is a hit in step 410, the cache control unit 132 may signal a hit and the method 400 may advance to step 420. In step 420, the cache control unit 132 may determine if there is a metadata match, as determined by comparing the metadata to LdCmpValue0 and LdCmpValue1. If the metadata matches, the cache control unit 132 in step 460 may forward the data from the cache line of the data memory 133.

If it is determined that the metadata does not match in step 420, the method may determine if there is another trap in step 430. Accordingly, if a trap is detected for the load memory operation (e.g. TLB miss, ECC error, etc.) the trap may be signaled, as opposed to forwarding the load data. If another trap is detected in step 430, the other trap may be signaled in step 450. If there is a metadata match in step 420 and no other trap is detected in step 430, the cache control unit 132 may signal a metadata trap to the trap lock of the processor. It is noted that the metadata load match logic is depicted within FIG. 4. Furthermore, if more than one trap is detected for the same load memory operation, other prioritizations/orderings of the traps may be implemented in other embodiments.

Figure 5:
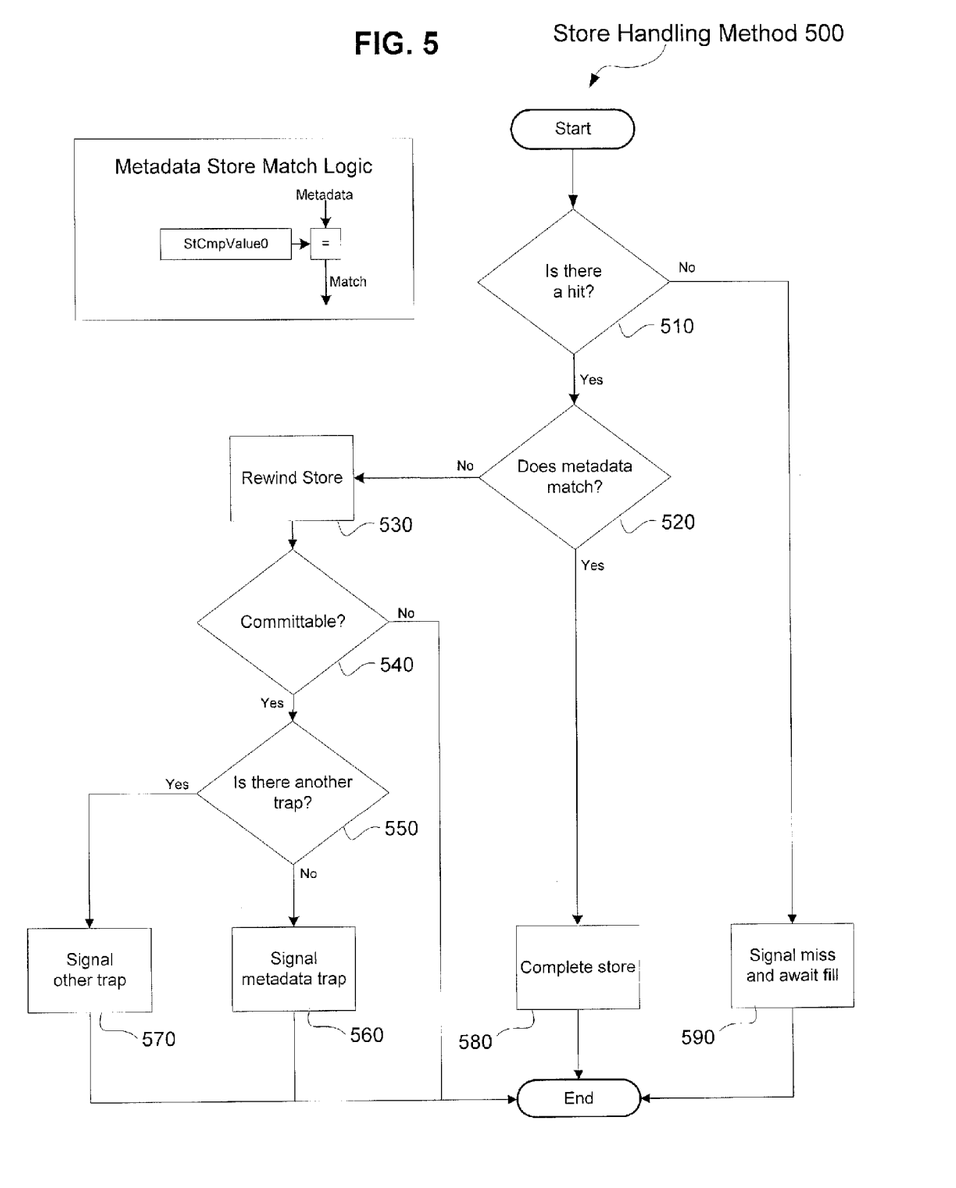
FIG. 5 shows an exemplary embodiment of a store handling method for cache controller store handling for the cache level that store buffer writes according to the exemplary embodiments described herein.

FIG. 5 shows an exemplary embodiment of a store handling method 500 for cache controller store handling for the cache level that stores buffer writes according to the exemplary embodiments described herein. Specifically, a store check compares the metadata (e.g., for the, by the store, addressed cache line) with one value stored in a per hardware thread register. If the metadata matches this value the store check succeeds. If not, the store is signaled as an exception/trap so that the low-level runtime software routine can be run.

Accordingly, FIG. 5 illustrates the operation of one embodiment of the cache control unit 132 for a store memory operation accessing the cache 130. It should be noted that, similar to method 400, method 500 is not limited to the step or order depicted in FIG. 5; as any order may be used. In addition, each of the steps in the exemplary method 500 may be performed in parallel in combinatorial logic in the cache control unit 123.

In step 510, the method 500 determines whether or not the store memory operation is a hit. If the store memory operation is a miss in the cache 130 in step 510, the method may advance to step 590. In step 590, the cache control unit 132 may signal a miss to the processor and may await the cache fill supplying the cache line for storage, as described in FIG. 6. According to one alternative embodiment, the cache control unit 132 may itself initiate the cache fill. In this example, the cache control unit 132 may signal miss by de-asserting the hit signal on the control interface. In a further alternative, no fill may be initiated for a cache miss by a store memory operation and the store memory operation may be passed to the next level of the memory hierarchy (e.g., the next level cache or the main memory).

If it is determined that there is a hit in step 510, the cache control unit 132 may signal a hit and the method 500 may advance to step 520. In step 420, the cache control unit 132 may determine if there is a metadata match. That is, a metadata match in FIG. 5 exists if the metadata and the value of the StCmpValue0 match. If the metadata is matches, in step 580, the cache control unit 132 may complete the store, updating the hitting cache line in the data memory 133 with the store data.

If it is determined that the metadata does not match in step 520, the cache control unit 132 may "rewind" the store memory operation in step 530. Rewinding the store memory operation may generally refer to undoing any effects of the store memory operation that may have been speculatively performed, although the mechanism may be implementation specific. For instance, instructions subsequent to the store memory operation may be flushed and refetched.

In step 540, the method 500 may determine if the store memory operation is committable (e.g., no longer speculative). If the store memory is not committable, the method 500 may end. Specifically, if the store memory operation is not committable in step 540, no further action may be taken. The store memory operation may be reattempted at a later time when the store is committable, or the trap may be taken at the time that the store is committable.

If the store memory is committable, the method 500 may determine whether there is another trap in step 550. If there is another trap detected for the store besides the metadata trap, the other trap may be signaled for the store memory operation in step 570. If no other trap has been signaled in step 550, the cache control unit 132 may signal the metadata trap in step 560. Furthermore, as noted above, if more than one trap is detected for the same load memory operation, other prioritizations/orderings of the traps may be implemented in other embodiments.

Figure 6:
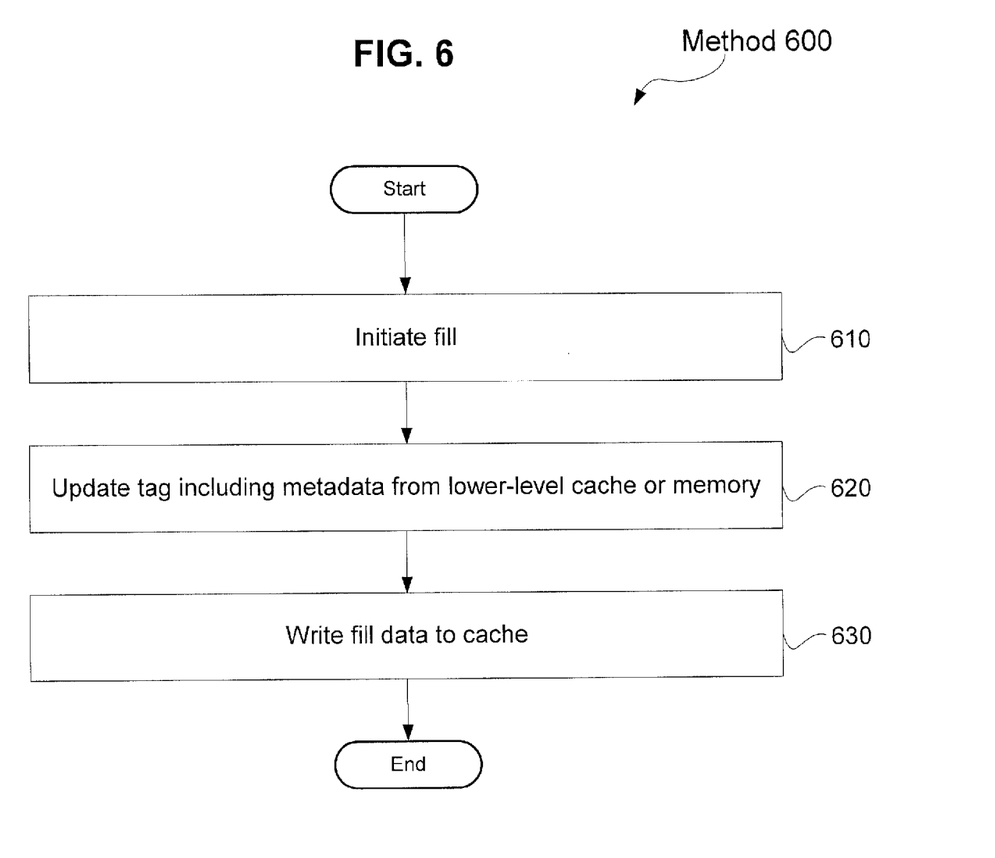
FIG. 6 shows an exemplary embodiment of a cache fill handling method for cache fill handling according to the exemplary embodiments described herein.

FIG. 6 shows an exemplary embodiment of a cache fill handling method 600 for cache fill handling according to the exemplary embodiments described herein.

In step 610, the method 600 may initiate the cache fill. As noted above, the cache fill may occur following a miss in the load handling process (step 410 of FIG. 4) and following a miss in the store handling process (step 510 of FIG. 5). In step 620, the method 600 may update the tag information within the tag memory 131 of the cache 130. Specifically, cache control unit 132 may update the cache tag of the cache entry to which the fill is targeted in the tag memory 131. Therefore, the tag information may be updated to include metadata from a lower level cache, or alternatively, from the memory 150 of the Node-0 110. The cache entry may be selected using any replacement algorithm. The address tag and state data may be written to the metadata portion of the memory tag 131. Additionally, the metadata bits, provided from the source of the data (e.g. a lower level cache or the main memory) may be written to the tag. Thus, the current metadata may be propagated within the node with the data. Alternatively, traps could be signaled and the trap code could discover the metadata bits in the lower level cache or main memory. In step 630, the cache control unit 132 may fill data to be written to the data memory 133 of the cache 130.

It should be noted that processors may not take precise traps for all kinds of store-related exceptions. For example, it may be the case that the store has already been committed by the processor core when data arrives to the cache level the store buffer operates against, and thus, when the metadata mismatch is detected. In this case, there may be no manner in which the store can be stopped or undone.

However, it is possible to stop the store from modifying the cache line data. According to one embodiment, it is possible to maintain determinism if the store data is stored to a dedicated hardware register in the store buffer or to a dedicated area in memory. The software routine may now read this value and synchronize with other processors. If needed, software may update memory when proper "permission" has been restored, and thus, the execution may continue. It should be noted that this embodiment may require a way to bypass the store buffer or a similar routine.

In addition, it should also be possible to deactivate one or more features of the exemplary systems and methods described herein. For instance, a simple "AND" gate and one register bit per load/store check may be utilized to accomplish this.

Furthermore, according to the embodiments described herein, the exemplary software may be able to read and write the per cache line metadata through special loads and stores that do not trap on read permission/store permission mismatches.

Having a processor core with these features would enable each of the exemplary embodiments described above with very low overhead. Exemplary systems and methods may be implemented within deterministic and still high-performance debugger applications. Moreover, additional embodiments may allow for much faster simulator applications for multi-core on multi-core simulation environments.

Those skilled in the art will understand that the above described exemplary embodiments may be implemented in any number of manners, including, as a separate software module, as a combination of hardware and software, etc. For example, the exemplary systems and methods may be implemented within a program containing lines of code stored in any type of non-transitory computer-readable storage medium that, when compiled, may be executed by a processor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A non-transitory computer readable storage medium including a set of instructions executable by a processor, the set of instructions, when executed, resulting in a performance of the following:

inserting metadata into a cache memory of a first core in a system including a plurality of cores;

performing one of a load check and a store check for a thread to be executed by a first one of the cores on the metadata to detect a respective one of a load metadata mismatch and a store metadata mismatch, wherein the load metadata mismatch is a mismatch between metadata of a load to be executed by the first core and core metadata, and wherein the store metadata mismatch is a mismatch between metadata of a store to be executed by the first core and the core metadata, further wherein the core metadata identifies at least one of the cores with permission to execute the load and at least one of the cores with permission to execute the store; and invoking a runtime software routine to order memory references upon a detection of one of the load metadata mismatch and the store metadata mismatch.

2. The non-transitory computer readable storage medium of claim 1, wherein the invoking the runtime software routine includes transferring control to a runtime library.

3. The non-transitory computer readable storage medium of claim 1, wherein the performing the load check includes:
comparing the metadata with a plurality of load values stored in a hardware thread register, and
signaling a trap upon a detected load metadata mismatch.

4. The non-transitory computer readable storage medium of claim 1, wherein the performing the store check includes:
comparing the metadata with a store value stored in a hardware thread register,
and signaling a trap upon a detected store metadata mismatch.

5. The non-transitory computer readable storage medium of claim 1, wherein the execution of the set of instructions further results in the performance of the following:
adding the load check and the store check to a cache controller of the first core; and
routing one of trap information and mismatch information to a local processing core upon detection of one of the load metadata mismatch and the store metadata mismatch.

6. The non-transitory computer readable storage medium of claim 1, wherein the execution of the set of instructions further results in the performance of the following:
trapping a first processor that does not have a current permission to the runtime software routine as a result of one of the load metadata mismatch and the store metadata mismatch; and
distributing permission to each of the plurality of processors that require new permission.

7. The non-transitory computer readable storage medium of claim 1, wherein the execution of the set of instructions further results in the performance of the following:
synchronizing a first processor with a remainder of the plurality of processors.

8. The non-transitory computer readable storage medium of claim 1, wherein the metadata is inserted into a cache line of the cache and follows the cache line into a dynamic random-access memory ("DRAM").

9. A system, comprising:
a plurality of cores within a multi-processor environment;
a cache memory within a first core of the cores and including metadata; and
a hardware check unit performing one of a load check and a store check for a thread to be executed by the first core on the metadata to detect a respective one of a load metadata mismatch and a store metadata mismatch, wherein the load metadata mismatch is a mismatch between metadata of a load to be executed by the first core and core metadata, and wherein the store metadata mismatch is a mismatch between metadata of a store to be executed by the first core and the core metadata, further wherein the core metadata identifies at least one of the cores with permission to execute the load and at least one of the cores with permission to execute the store, and invoking a runtime software routine to order memory references upon a detection of one of the load metadata mismatch and the store metadata mismatch.

10. The system of claim 9, wherein the invoking the runtime software routine includes transferring control to a runtime library.

11. The system of claim 9, wherein the performing the load check includes comparing the metadata with a plurality of load values stored in a hardware thread register and signaling a trap upon a detected load metadata mismatch.

12. The system of claim 9, wherein the performing the store check includes comparing the metadata with a store value stored in a hardware thread register and signaling a trap upon a detected store metadata mismatch.

13. The system of claim 9, wherein the hardware check unit is added to a cache controller of the first core and one of trap information and mismatch information is routed to a local processing core upon detection of one of the load metadata mismatch and the store metadata mismatch.

14. The system of claim 9, wherein the runtime software routine traps a first processor that does not have a current permission to the runtime software routine as a result of one of the load metadata mismatch and the store metadata mismatch and distributes permission to each of the plurality of processors that require new permission.

15. The system of claim 9, wherein the runtime software routine synchronizes a first processor with a remainder of the plurality of processors.

16. The system of claim 9, wherein the metadata is inserted into a cache line of the cache and follows the cache line into a dynamic random-access memory ("DRAM").

17. A method of updating an address table, comprising:
inserting metadata into a cache memory of a first core in a system including a plurality of cores;
performing one of a load check and a store check for a thread to be executed by the first core on the metadata to detect a respective one of a load metadata mismatch and a store metadata mismatch, wherein the load metadata mismatch is a mismatch between metadata of a load to be executed by the first core and core metadata, and wherein the store metadata mismatch is a mismatch between metadata of a store to be executed by the first core and the core metadata, further wherein the core metadata identifies at least one of the cores with permission to execute the load and at least one of the cores with permission to execute the store; and
invoking a runtime software routine to order at least one memory reference upon a detection of one of the load metadata mismatch and the store metadata mismatch.

18. The method of claim 17, wherein the invoking the runtime software routine includes transferring control to a runtime library.

19. The method of claim 17, further comprising:
adding the load check and the store check to a cache controller of the first core; and
routing one of trap information and mismatch information to a local processing core upon detection of one of the load metadata mismatch and the store metadata mismatch.

20. The method of claim 17, further comprising:
trapping a first processor that does not have a current permission to the runtime software routine as a result of one of the load metadata mismatch and the store metadata mismatch;
synchronizing the first processor with a remainder of the plurality of processors; and
distributing permission to each of the plurality of processors that require new permission.

* * * * *